March 24, 1970 G. ERB ET AL 3,501,864
SWINGABLE SLIDING CAR DOOR ASSEMBLY
Filed April 17, 1968 9 Sheets-Sheet 1
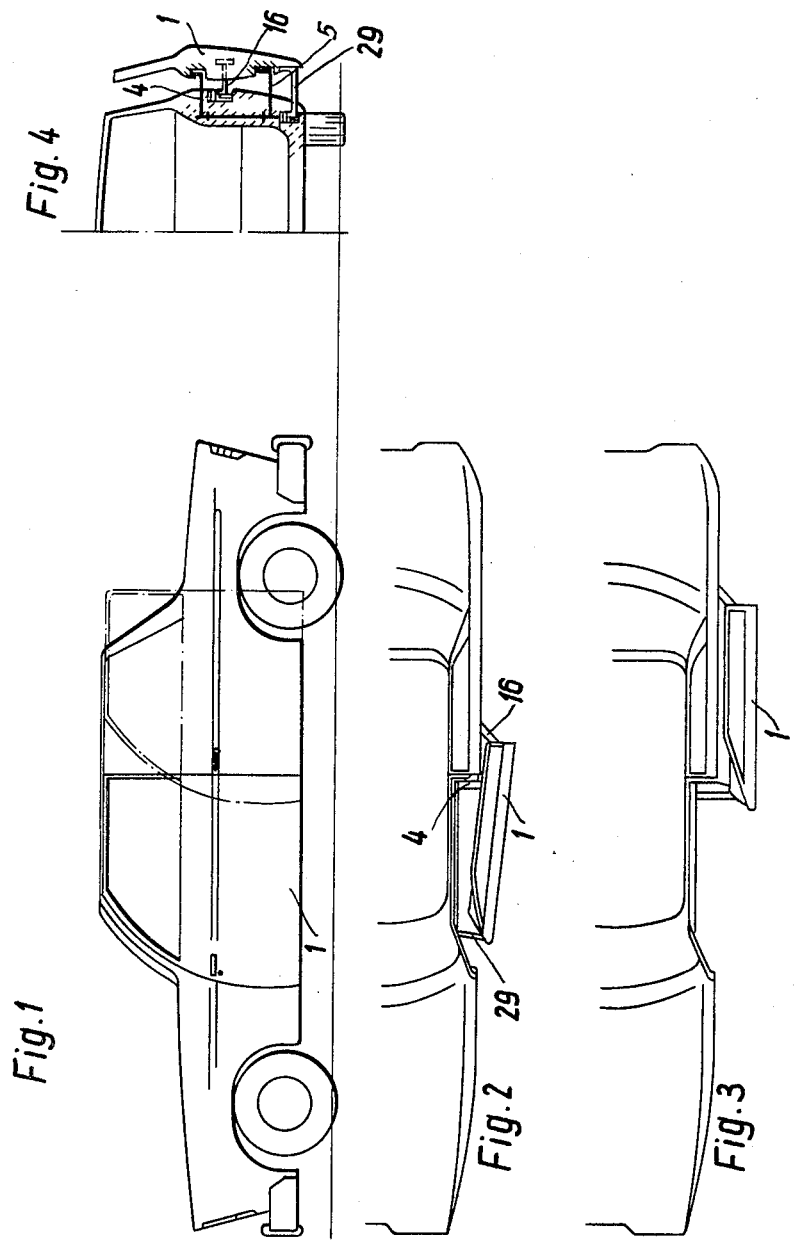
Inventors
GERHARD ERB
INGO BRITZKE
BY Hans and Batley
ATTORNEYS March 24, 1970   G. ERB ET AL   3,501,864
SWINGABLE SLIDING CAR DOOR ASSEMBLY
Filed April 17, 1968   9 Sheets-Sheet 2
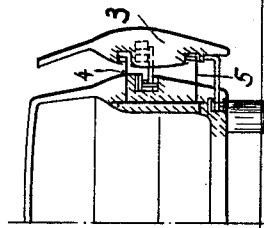
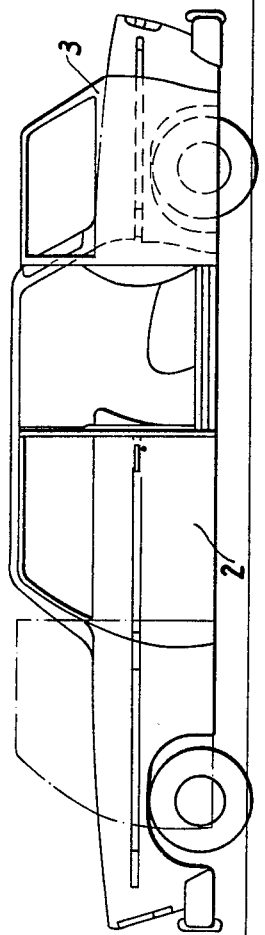
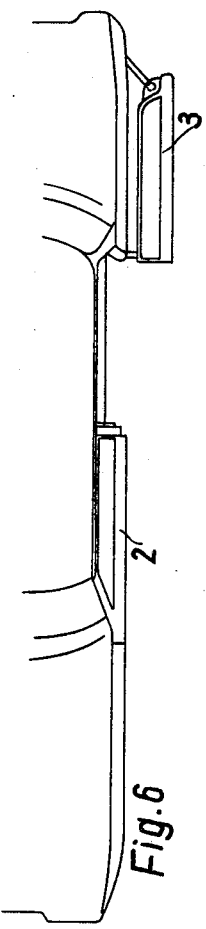
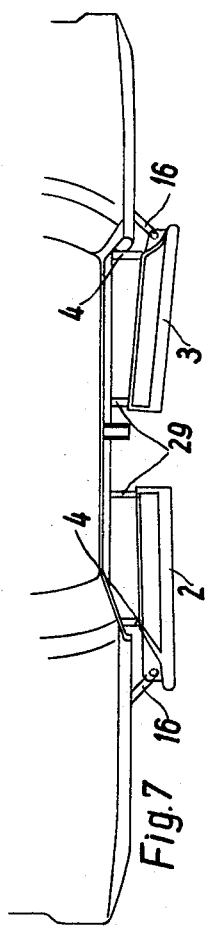
Inventors
GERHARD ERB
INGO BRITZKE
BY Hans and Baxter
ATTORNEYS

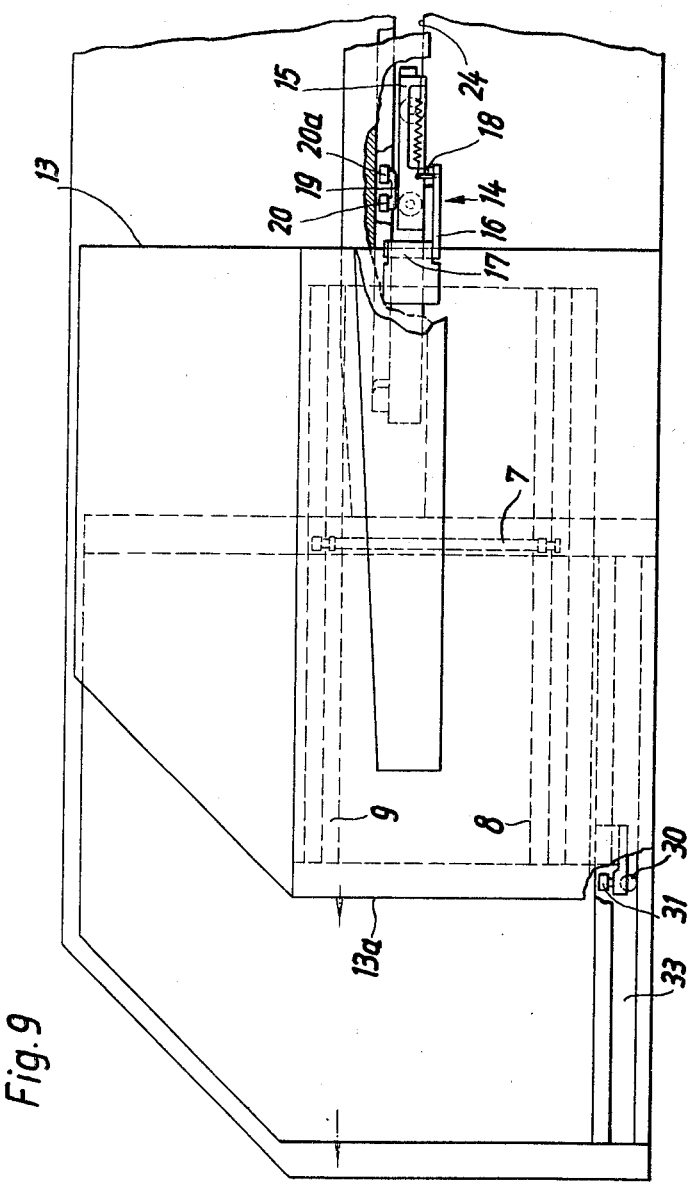

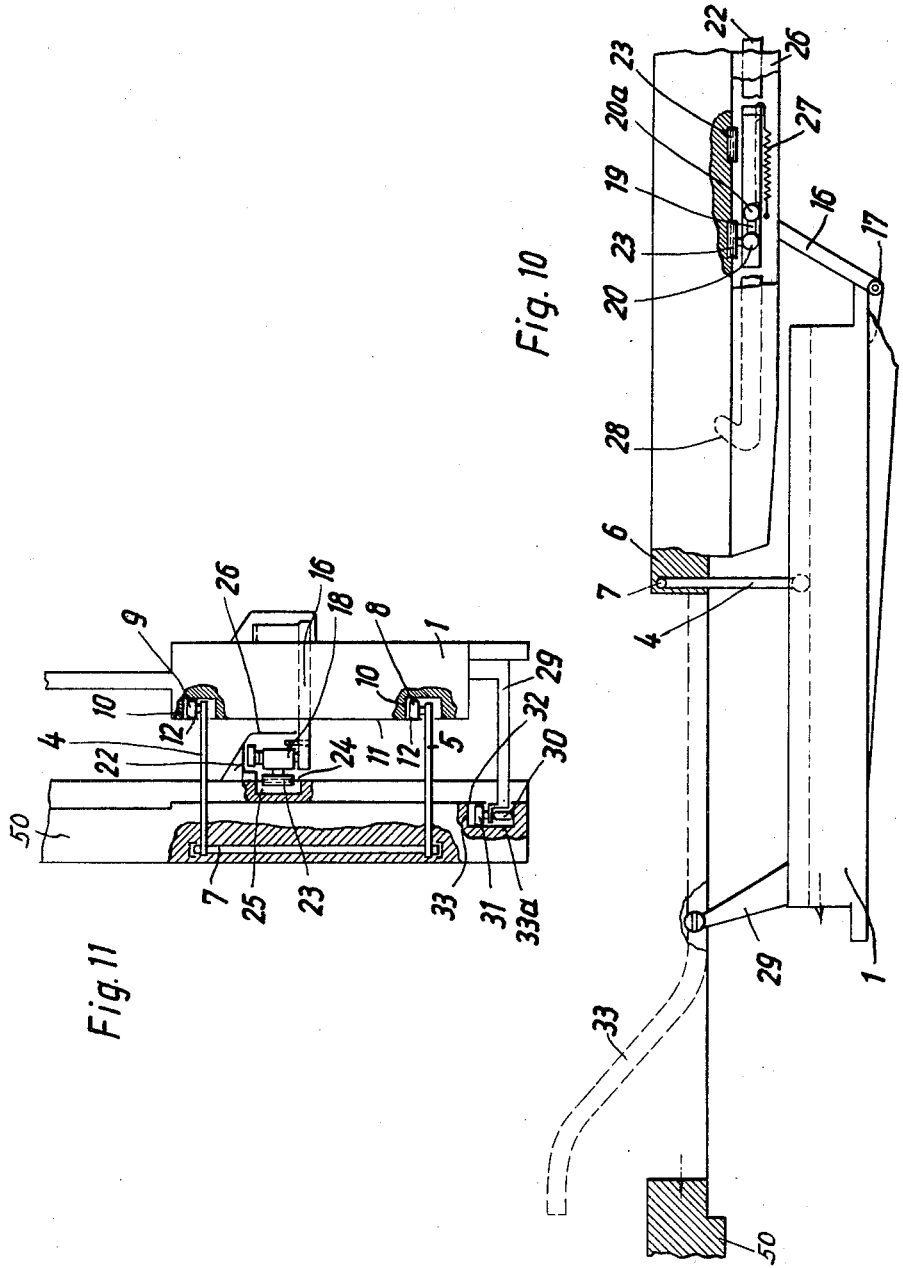

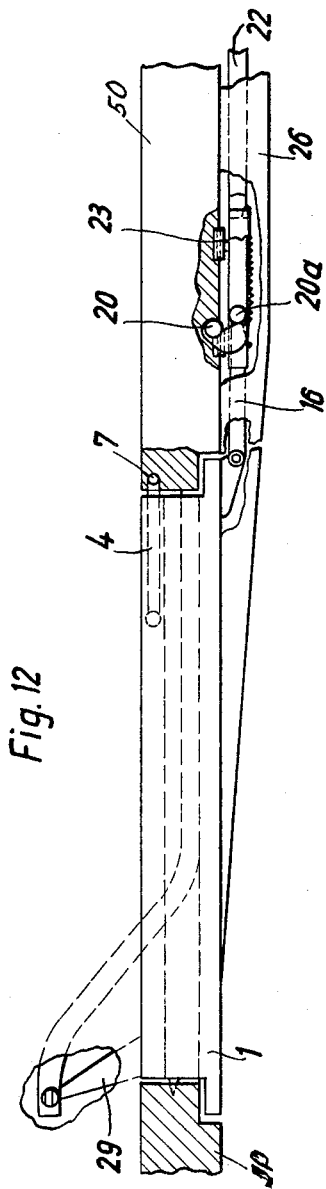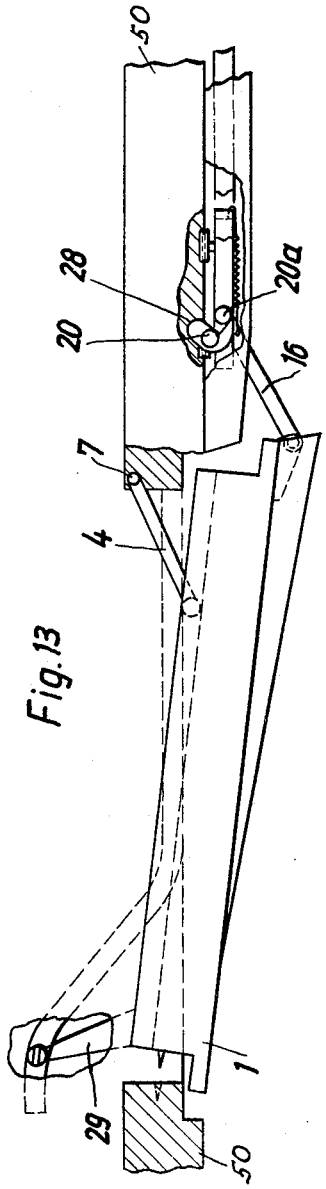

March 24, 1970  G. ERB ET AL  3,501,864
SWINGABLE SLIDING CAR DOOR ASSEMBLY
Filed April 17, 1968  9 Sheets-Sheet 6
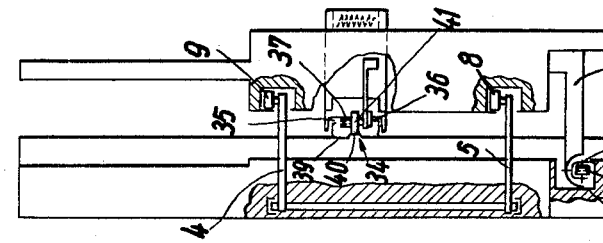
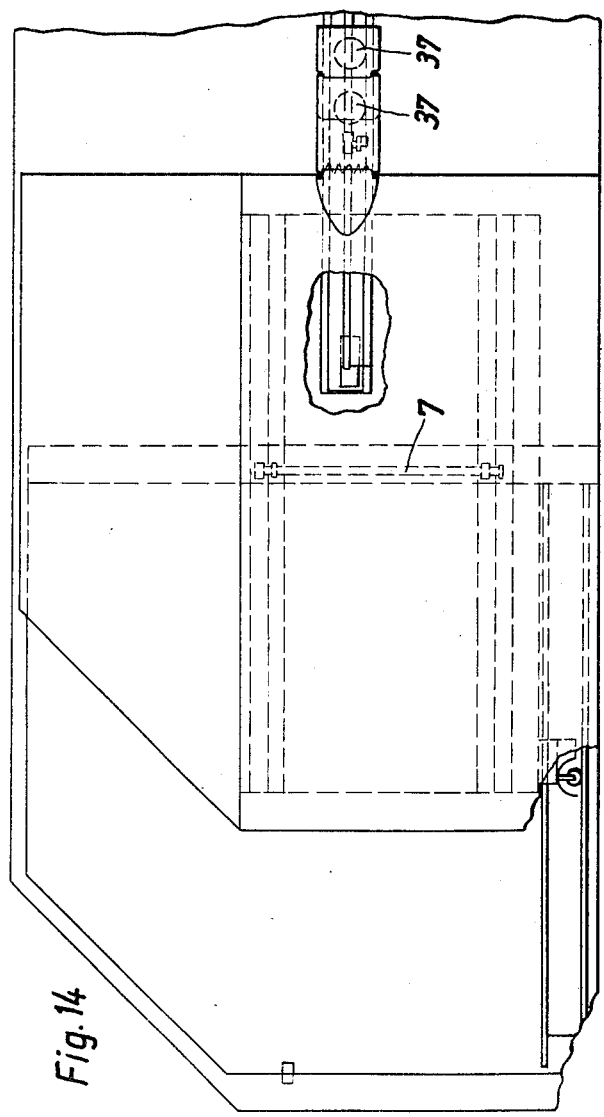
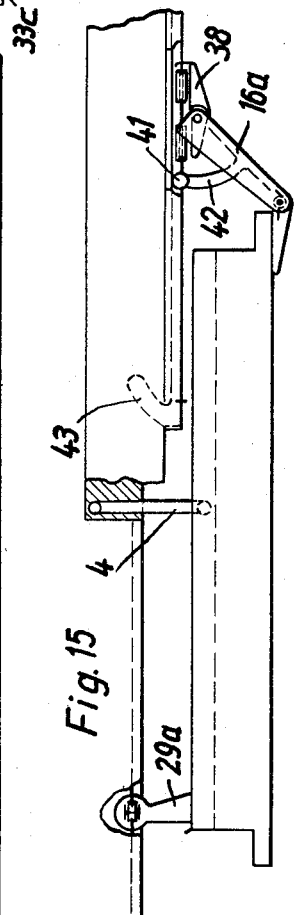
Inventors
GERHARD ERB
INGO BRITZKE
BY Hans and Bayley
ATTORNEYS March 24, 1970   G. ERB ET AL   3,501,864
SWINGABLE SLIDING CAR DOOR ASSEMBLY
Filed April 17, 1968   9 Sheets-Sheet 7

Inventors
GERHARD ERB
INGO BRITZKE
BY Harris and Barkley
ATTORNEYS

Inventors
GERHARD ERB
INGO BRITZKE
BY Hane and Baxley
ATTORNEYS

March 24, 1970  G. ERB ET AL  3,501,864
SWINGABLE SLIDING CAR DOOR ASSEMBLY
Filed April 17, 1968  9 Sheets-Sheet 9
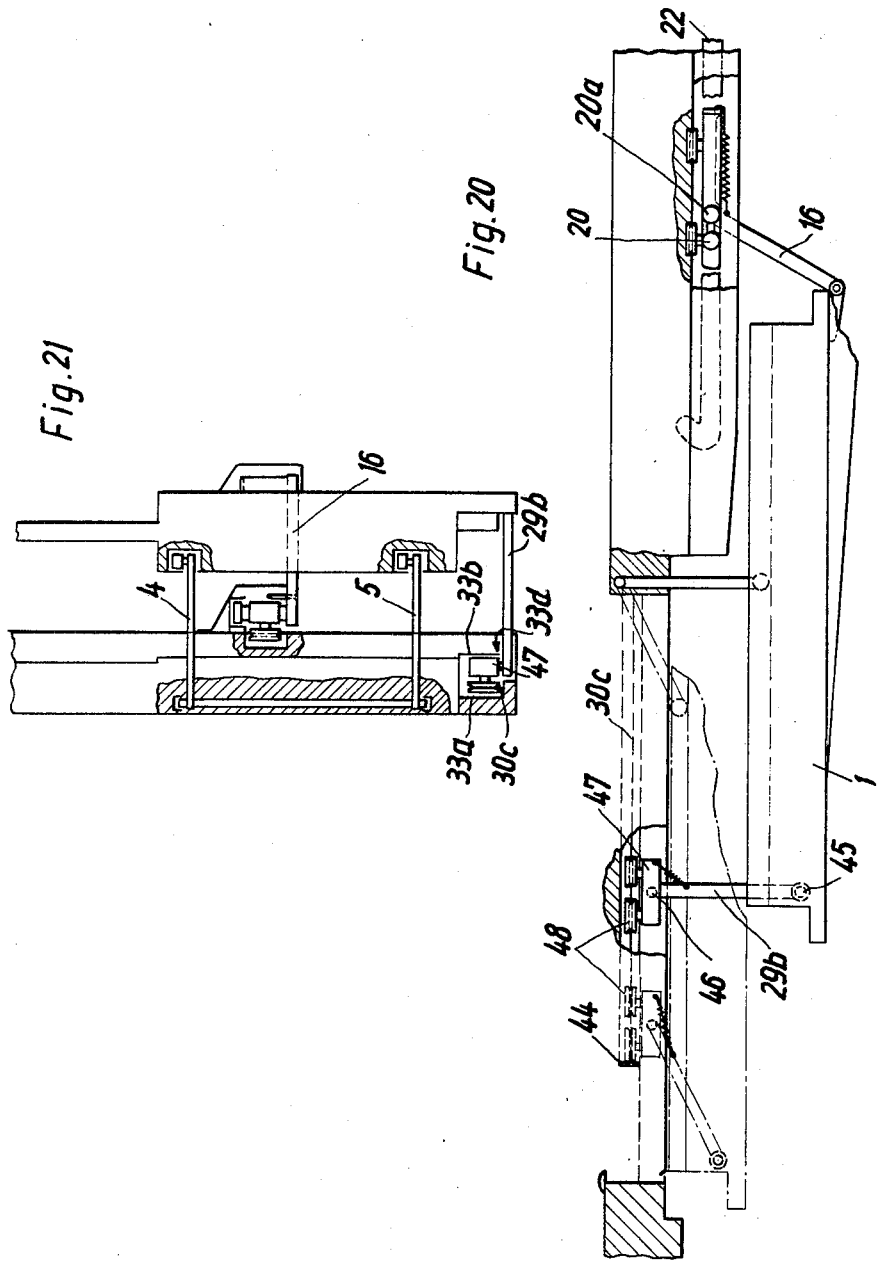
Inventors
GERHARD ERB
INGO BRITZKE
BY Hans and Bayley
ATTORNEYS

United States Patent Office 3,501,864
Patented Mar. 24, 1970

3,501,864
SWINGABLE SLIDING CAR DOOR ASSEMBLY
Gerhard Erb, Kassel, and Ingo Britzke, Kassel-Bettenhausen, Germany, assignors to Wegmann & Co., Kassel-Bettenhausen, Germany, a company of Germany
Filed Apr. 17, 1968, Ser. No. 721,993
Claims priority, application Germany, Apr. 21, 1967, W 43,821
Int. Cl. E05d 15/10; B60j 5/06
U.S. Cl. 49—215                                9 Claims

ABSTRACT OF THE DISCLOSURE

A door for a car particularly for a passenger car which can be opened and closed by a combination of swinging and sliding movements. Linkage means steady the door in all positions thereof, The linkage means also guide and support the door while the same is being moved into and out of its closed position and prevent effectively a tilting of the door out of its correct vertical plane. The door can be gently closed, or can be slammed in the same manner as a hinged door. The entire linkage and guidance mechanism of the door is concealed except for a few barely noticeable slots on the outside of the car body and at the door frame so that the ornamental appearance of a car equipped with the door according to the invention is not marred.

CROSS REFERENCES

Copending application Ser. No. 722,000 filed Apr. 17, 1968, and copending application Ser. No. 722,039 filed Apr. 17, 1968.

The invention relates to a swingable sliding door assembly for cars, especially passenger cars, in which the door is opened by first swinging it out of its closed position and then sliding it into its open position and is closed by first sliding it toward its closed position and then swinging it into the door opening. More particularly, the invention relates to a car door assembly in which the door is held vertically in any position by means of two support bars pivotally mounted on one end of the car body in vertically spaced and mutually parallel relationship and guided at the other end in a pair of vertically spaced tracks on the inside wall of the door, and in which a guide mounted on one of the vertical side edges of the door is linked to a carrier guided by rollers on a rail secured on an outside wall of the car body.

There are known, for instance from British Patent 389,061, swingable sliding car door assemblies in which below the lower cross beam of the door frame a rail is mounted for guiding a wheeled carrier. A guide bar is linked on one end to the carrier and guided at the other end between two pairs of rolls fixedly secured to the inside wall of the swingable sliding door. In such assembly the door, after having been swung out of the door opening by means of a pivotal arm, slides along the guide bar the other end of which is simultaneously moved by the carrier along the rail mounted below the level of the door opening.

Such an arrangement has the disadvantage that due to unfavorable directions of force and an unfavorable distribution of the load, a convenient slamming of the door—as is possible with hinged doors and as also desirable for sliding doors—is not possible. Moreover, the door is not safely guided at all points, especially when it is in the swung-out position. As a result, the door cannot readily sustain additional loads as may be caused, for instance, by a person leaning on the open door.

It is a broad object of the invention to provide a novel and improved swingable sliding car door assembly which is free of the aforepointed out disadvantage, is fully supported in all positions, can be gently closed or slammed as desired, and the manufacture of which is simple and inexpensive.

Another more specific object of the invention is to provide a novel and improved swingable sliding car door assembly, the entire guiding and supporting mechanism of which is concealed to such an extent that the ornamental appearance of the car body is not appreciably marred.

The aforepointed out objects, features and advantages and other objects, features and advantages which will be pointed out hereinafter are obtained by linking to one lengthwise side edge of the door a guide member, the other end of which is linked to a wheeled carrier rotatable about a vertical axis. The carrier is lengthwise rollable on a guide rail secured to an outside wall of the car body. The opposite side edge of the door mounts a support bar, the free end of which is guided by a rail supported by the car body below the lower level of the door opening.

There are known slidable swinging car door assemblies in which at about the middle of a lengthwise side edge of the door a hinged guide arm is mounted, and the opposite side edge of the door is supported by a roll guided by a rail mounted above the upper cross beam of the door frame. Such an arrangement has the disadvantage that it considerably mars the ornamental appearance of the car body.

According to the invention, the door while being slid is supported by support bar and the hinged guided member mounted on opposite lengthwise sides of the door, as explained before. Holding and steadying the door against lateral tilting is effected by a pair of support bars which are hinged to the door frame of the car body in vertically spaced and mutally parallel relationship. These support bars support each a roll rotatable about a vertical axis. These rolls are guided by downwardly facing rails of U-shaped cross-section secured to the inside wall of the door, preferably sunk into the same.

An arrangement of this kind has the advantage that the ornamental appearance of the car body is not materially affected as the rail secured to the outside wall of the car body is located at about the middle of the height of the door. An ornamental strip is often provided at this level as part of the styling of the car and can then be used as cover strip for the outside rail. If such ornamental strip is not present, a cover strip can be readily provided in a manner such that it creates the impression of being an ornamental strip. Moreover, the arrangement of the mechanism according to the invention does not require the mounting of any guide rails on the upper part of the car body where they would be particularly noticeable.

According to a further aspect of the invention, the aforementioned guide member is in the form of a U-shaped member, the shanks of which are utilized as pivot pins for linking the guide member to the door and for rotating the rollable carrier about a vertical axis. The pivot pin supporting the carrier has secured thereto a bar mounting a guide roll rollable about a vertical axis. A second guide roll also rotatable about a vertical axis may be mounted on the second pivot pin. The guide roll mounted on the bar is guided by a rail of U-shaped cross-section which is secured on an outside wall of the car body facing downwardly and preferably ends in a hook portion facing rearwardly. When the roll approaches the end of its displacement on the rail it engages the hook portion thereby positively guiding the door into its fully closed position.

The lengthwise edge of the door opposite to the one to which the guide member is linked, has rigidly secured thereto at its lower corner a support bar mounting at its free end a support roll rotatable about a horizontal axis and above the support roll a guide or retaining roll rotatable about a vertical axis. The guide roll is guided by a vertical rail which may be a flange of a guide rail of U-shaped cross-section incorporated in the car body facing downwardly. The use of a downward facing U-rail for guiding the guide roll has the advantage that there is visible only a narrow gap or slot, the width of which just fits the thickness of the support bar.

The outside guide rail for guiding the carrier can also be sunk into a wall of the car body so that only a lengthwise slot is visible. This slot can be covered except for the width necessary for passage of the guide member by a cover strip designed in the manner of an ornamental strip.

As is now apparent, the assembly of the invention is practically invisible on the outside of the car body, but provides all rails and linkage or guide means necessary for guiding and strongly supporting the door in all positions thereof.

According to another embodiment of the invention, which is particularly suitable for delivery trucks and other commercial vehicles for which an ornamental appearance is not so important, the outer rail for guiding the carrier may be mounted at about the middle of a lengthwise side edge of the door outwardly protruding therefrom and may have a U-shaped cross-section. The rim portions of the branches of the rail are vertically bent toward each other and serve as guides for rollers for the carrier. The web of the U-shaped rail may have a central lengthwise protrusion, constituting a running surface for a guide roll rotatable about a vertical axis and mounted on the car body by means of a suitable bracket. The U-rail terminates in an upwardly facing hook portion which is engaged by the roll when the door approaches its fully closed position.

The guide member is preferable in the form of a U-shaped shell of a width corresponding to the width of the web of the U-shaped rail so that the support rollers for the carriage are not visible.

The heretofore described embodiment whereby the door is supported by a support bar is guided in a guide rail mounted below the lower level of the door opening and extending across the entire width of the door opening. However, for many types of cars a guide rail extending across the width of the door opening and mounted below the level thereof is not desirable.

According to a still further aspect of the invention, the support bar on the side edge of the door opposite to the one mounting the guide member is linked on one end to the door and on the other to a carrier which is rollable along a guide rail disposed below the level of the door opening and fitted into the respective wall of the car body but in contrast to the previously described embodiments extends only across part of the width of the door.

In the accompanying drawing, several embodiments of the invention are shown by way of illustration and not by way of limitation.

In the drawing:

FIG. 1 is a digrammatic elevational view of a two-door passenger car equipped with swingable slidable doors according to the invention;

FIG. 2 is a fragmentary plan view of FIG. 1 showing one of the doors of the car in a partly opened position;

FIG. 3 is a similar fragmentary plan view showing the same door in its fully open position;

FIG. 4 is a fragmentary cross-sectional view showing the door in its swung-out position;

FIG. 5 is a digrammatic elevational view of a four-door passenger car equipped with swingable sliding doors according to the invention, one of the rear doors being shown in its open position;

FIG. 6 is a fragmentary plan view of FIG. 5 showing the same door in its open position;

FIG. 7 is a fragmentary similar plan view but showing both doors of the car on the same side thereof in partly open position;

FIG. 8 is a fragmentary sectional view showing the open door of FIG. 5;

FIG. 9 is an elevational diagrammatic view, partly in section, of the mechanism for one of the door assemblies;

FIG. 10 is a fragmentary plan view, partly in section, of FIG. 9;

FIG. 11 is an elevational sectional view, partly in section, of FIG. 9;

FIG. 12 is a fragmentary plan view, partly in section, showing one of the car doors in its closed position;

FIG. 13 is a plan view similar to FIG. 12, but showing the same door in a partly opened or closed position;

FIG. 14 is a digrammatic elevational view, partly in section, of a modification of one of the door mechanisms;

FIG. 15 is a fragmentary plan view, partly in section, of FIG. 14;

FIG. 16 is an elevational sectional view, partly in section, of FIG. 14;

FIG. 20 is a fragmentary diagrammatic plan view, partly in section, of FIG. 19; and FIG. 21 is an elevational view, partly in section, of FIG. 19.

Figure 17:
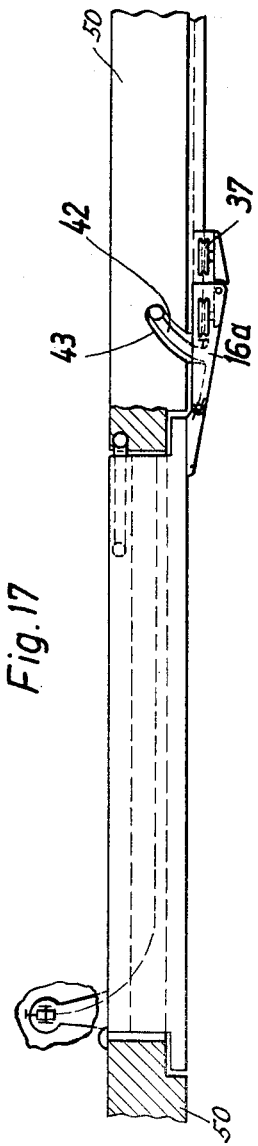
FIG. 17 is a fragmentary diagrammatic plan view of one of the doors according to FIGS. 14, 15 and 16 in its closed position.

Referring now to the figures more in detail, either one of the doors of the car according to FIG. 1 is opened by first swinging the respective door outwardly and then sliding it toward the rear end of the car. Either one of the front doors of the car according to FIG. 5 is opened by first swinging it outwardly and then sliding it toward the front of the car, and either one of the rear doors is opened by first swinging it outwardly and then sliding it toward the rear of the car.

The mechanism is the same for all the doors except, of course, that the several guiding and supporting structural elements of the mechanism must be differently placed, depending upon whether the respective door is to be opened by moving it toward the front or the rear of the car.

To simplify the description, the mechanism is described for only one of the doors, which is believed to be fully sufficient for the understanding of the invention.

The doors are designated by numerals 1, 2 and 3. The mechanism of door 1 will now be described in detail in conjunction with FIGS. 9 to 13, inclusive.

Door 1 is movable into and out of a position closing the opening in a car body 50. The door is opened by first swinging it out of its position and then sliding it toward the rear (or toward the front as the case may be). Similarly, the door is closed by sliding it first toward the car opening and then swinging it into the car opening, as will become more fully apparent from the subsequent description.

The door is secured against tilting out of its normal vertical plane by two pairs of support bars 4 and 5. The bars are mounted on one end on a pivot shaft 7 mounted in one of the vertical posts of the car body; the car opening is conventional and can best be seen in FIG. 11. Pivot shaft 7 holds the two bars in vertically spaced and mutually parallel relationship.

The free ends of bars 4 and 5 mount rolls 9 and 8, respectively. The rolls are guided in elongate horizontal guide rails 10 of U-shaped cross-section inserted into the inner sidewall 11 of door 1 so that the flanges of the rails face downwardly. The outer flange 12 of each rail is preferably substantially flush with door wall 11, thereby retaining rolls 9 and 8 in the rails and also concealing the rails except for a narrow slot required for passage of bars 4 and 5.

As is evident, other suitable guiding and retaining means may also be provided; it is merely necessary that such means are capable of holding the rolls in the guide rails.

The rear edge 13 of the door, assuming the door is slid toward the right for closing—or the door edge 13a if the door is slid toward the left for closing—mounts a guide member 14 which is linked to the door and also to a wheeled carrier 15.

Guide member 14 is shown as a generally U-shaped part 16 having shanks 17 and 18, shank 17 constituting a pivot pin for linking U-part 16 to the door and shank 18 constituting a pivot pin for linking the U-part to carrier 15. The pivot pin 18 mounts on its free end, fixedly secured thereto, a bar 19 which in turn mounts a guide roll 20 rotatable about a vertical axis. A second guide roll 20a may be secured directly to shank 18. Guide rolls 20 and 20a are guided in a rail 22 of U-shaped cross section secured to a wall of the car body.

Carrier 15 has support rollers 23 rollable on a rail 24 which is fitted in a suitably shaped guide groove 25 in a wall of the car body. Such an arrangement has the advantage that the carrier does not much protrude beyond the outer surface of the car body. A cover strip 26 may be provided to conceal the guide groove and the just described components located therein, as can best be seen in FIG. 11, or an already existing cover strip may be used for the same purpose. As previously indicated, it is a general object of the invention to arrange and locate the door mechanism in a manner such that as little as possible of the mechanism is visible.

U-part 16 is joined to carrier 15 by a spring 27 which is so biased that it pulls part 16 outwardly when the door is opened.

Rollers 23 of the carrier serve to support the door while being slid, while guide rolls 20 and 20a serve to guide the door at a definite and safe distance from the outer wall surface of the car body.

U-shaped rail 22 is preferably so shaped that the door when being slammed or gently closed is automatically forced into the door opening. To this end, the rail terminates on one end in an outwardly facing hook portion 28 into which guide rail 20 mounted on bar 19, as previously described, enters when U-part 16 is pivoted. FIGS. 12 and 13 clearly show different operational positions of part 16 and also the positions occupied by roll 20 in accordance with the angular position of part 16.

Door 1 is further supported by a support bar 29 mounted at the lower corner of the side edge opposite to the one supporting guide member 14. The support bar is fixedly secured to the door and mounts at its free end a support roll 30 rotatable about a horizontal axis and above this roll a guide or retaining roll 31 rotatable about a vertical axis. Upper roll 31 is guided along and abuts against a vertical strip 32. This strip may be constituted by one shank of a rail 33 of U-shaped cross-section. The rail is suitably mounted in a track-like groove 33a disposed below the level of the lower cross-beam of the door frame. Track 33a is so dimensioned that it also accommodates support roll 30. Rail 33 terminates on one end in a suitably curved portion so that the door is forced into the door opening when roll 31 enters the curved rail portion.

Turning now to the door assembly in FIGS. 14, 15 and 16, these figures exemplify a mechanism in which a guide rail 34 is mounted on a wall portion of the car body outwardly protruding therefrom. The guide rail has a substantially U-shaped cross-section and the shanks of the rail are turned vertically downwardly and upwardly at 35 and 36, as can best be seen in FIG. 16. The turned-in rim portions 35, 36 guide and retain preferably peripherally grooved support rolls 37 for a wheeled carrier 38. The web 39 of rail 34 has a substantially centered lengthwise elongate protrusion 40 constituting a running surface for a guide roll 41 supported by a bracket 42 fixedly secured to a guide member 16a. This guide member is in the form of a substantially U-shaped shell, the width of which corresponds approximately to the width of rail 34.

Figure 18:
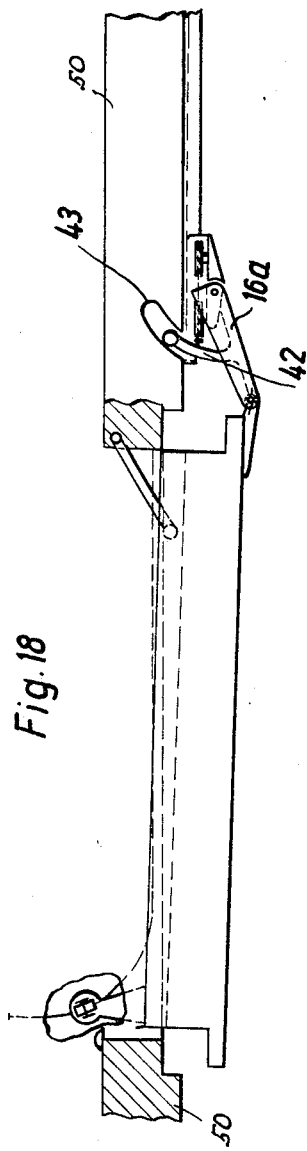
FIG. 18 is a plan view similar to FIG. 17, but showing the same door in partly opened or closed position.

Running surface 40 is continued by a hook portion 43 which has the same function as hook portion 28 described in connection with FIG. 10. The hook portion and its function are best shown in FIGS. 17 and 18.

The remaining mechanism of the assembly according to FIGS. 14 to 18 inclusive corresponds to the mechanism of the assembly shown in FIGS. 9, 10 and 11, except that a support bar 29a secured to the edge corner opposite to the one mounting guide member 16a mounts only one support roll 30a guided on a rail 30b fitted into a tracklike groove 33c.

Figure 19:
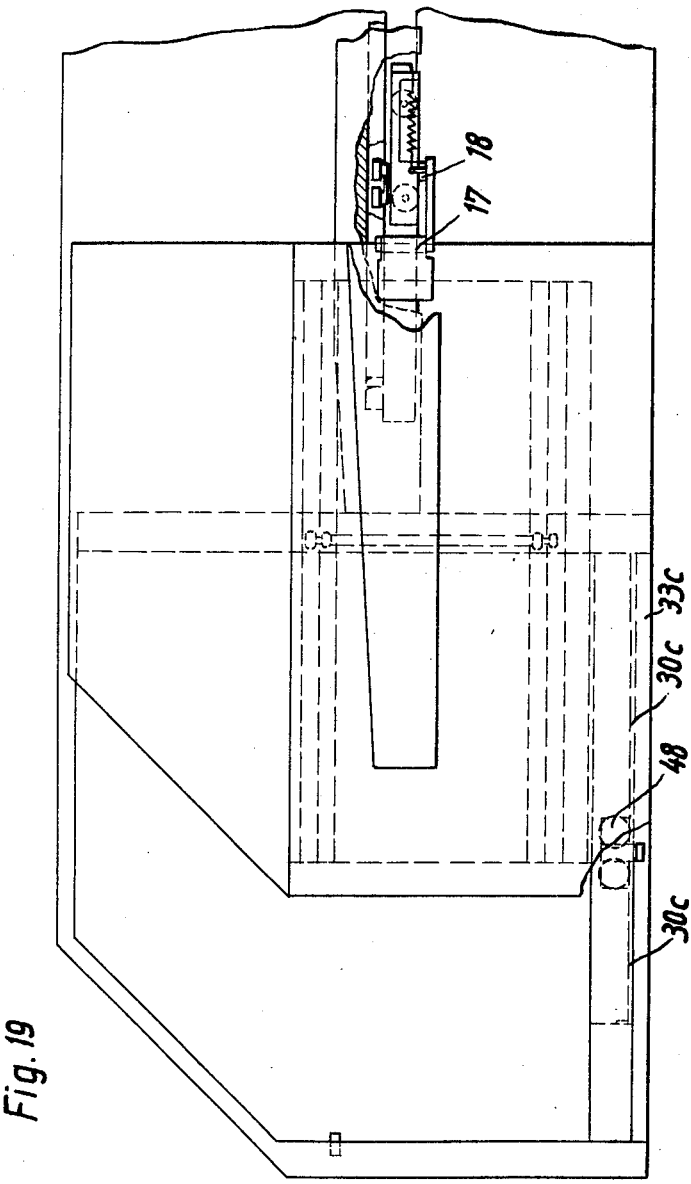
FIG. 19 is a diagrammatic elevational view, partly in section, of a second modification of the mechanism of one of the doors.

FIGS. 19, 20 and 21 show a door assembly which is basically similar to that of FIGS. 9, 10 and 11 except with respect to the mounting of support bar 29b on the side edge of the door instead of the one to which the guide member 16 is hinged. The guide rail 30c provided below the level of the door opening does not extend across the entire width of the door opening, but ends at a point 44. This makes it necessary to provide a pivotal support bar 29b instead of a rigidly mounted bar 29 or 29a, as previously described. Bar 29b is hinged on one end to the door by a pivot pin 45 and at the other end to a wheeled carrier 47 by a pivot pin 46. Rollers 48 of carrier 47 are guided on rail 30c mounted in a groove 33c. This groove is concealed by a cover strip 33b except for a narrow gap 33d providing passage for support bar 29b.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A swingable sliding door assembly for a car comprising in combination:
    (a) a car body including an opening for a door;
    (b) a door swingable and slidable into and out of a position closing said door opening;
    (c) a pair of first support bars;
    (d) a pivot shaft secured to the car body in vertical position, said shaft pivotally supporting said first support bars in vertically spaced and mutually parallel relationship;
    (e) said door having in its inner side wall a pair of horizontal elongate and vertically spaced first guide rails, the other end of each of said first support bars extending into one of said rails slidably retained therein, said bars retaining the door in vertical position in any of the positions of the door with reference to the door opening;
    (f) a second support bar fixedly secured on one end by one of the lengthwise side edges of the door;
    (g) a first carrier linked to the other end of said second support bar;
    (h) a curved second guide rail secured to an outside wall of the car body below the level of the door opening supporting said first carrier and guiding the same along said second guide rail;
    (i) a guide member linked on one end to the opposite lengthwise side edge of the door about the middle thereof, and having on its other end a vertical pin;
    (k) a second carrier rotatable about a horizontal axis on said vertical pin on the guide member; and
    (l) a third guide rail horizontally secured to an outside wall of the car body and guiding said second carrier along the third rail, said guide member being substantially U-shaped, one shank of said guide member constituting a pivot axis for linking the guide member to the door and the other shank constituting a pivot axis for the second carrier, the shank constituting the pivot axis for the second carrier having secured thereto an arm mounting a guide roll, and said third guide rail being a rail of U-shaped cross-section, said guide roll being guided by said U-shaped rail lengthwise displaceable therein, and said U-shaped rail terminating at its end adjacent to the door opening in a rearwardly facing hook portion into which said guide roll enters when the door approaches its closed position, thereby pulling the door into its closed position.

2. The car door assembly according to claim 1 wherein said other end of said second support bar mounts a support roll rotatable about a horizontal axis and above said support roll a guide roll rotatable about a vertical axis, said guide roll being guided by said second guide rail.

3. The car door assembly according to claim 2 wherein said second guide rail comprises a rail of U-shaped cross-section facing downwardly, said second rail terminating at its end adjacent to said other side edge of the door in an inwardly curved portion for pulling the door at said other lengthwise side edge thereof into its closed position, one of the shanks of said U-shaped second guide rail being engaged with said first carrier for guiding and retaining the same, said one shank being substantially flush with the respective outside wall of the car body.

4. The car door assembly according to claim 1 wherein each of first support bars mounts at its free end a roll rotatable about a vertical axis, and wherein each of said first guide rails is of substantially U-shaped cross-section and facing downwardly, the outside shank of each first rail guiding and retaining the roll mounted on the respective first support bar.

5. The car door assembly according to claim 4 wherein the outside shank of each first guide rail is substantially flush with the inner side wall of the door.

6. The car door assembly according to claim 1 wherein said third guide rail is secured to a wall portion of the car body, at a lengthwise side of the door opening, the shanks of said third rail facing downwardly and the rim portions of the shanks being bent to extend toward each other, and wherein said second carrier has running rollers guided between said facing rim portions.

7. The car door assembly according to claim 6 wherein the web of said U-shaped third guide rail has a substantially centered elongate protrusion, and wherein a guide roll is secured to said guide member and guided along the protrusion. said protrusion terminating at its end adjacent to the door opening in a hook portion facing away from the door opening, said last mentioned guide roll entering said hook portion when the door approaches its closed position thereby forcing the door into its closed position.

8. The car door assembly according to claim 7 wherein said guide member is in the form of an elongate shell having a width corresponding to the width of the U-shaped third guide rail and covers said third guide rail except for a lengthwise slot through which the guide member extends between the shanks of said third guide rail.

9. The car door assembly according to claim 1 wherein cover strips cover each of the guide rails mounted in an outer wall portion of the car body.

References Cited

UNITED STATES PATENTS

| 3,019,492 | 2/1962 | Schimek | 49—212 |
| 3,204,999 | 9/1965 | Schwenk | 49—213 |
| 3,318,048 | 5/1967 | Odend'hal | 49—223 |

FOREIGN PATENTS 389,061 5/1931 Great Britain.

OTHER REFERENCES

German Application No. 1,082,509, Wegmann, printed May 25, 1960.

KENNETH DOWNEY, Primary Examiner

U.S. Cl. X.R.

49—218